[19] United States Patent
Crothers

[11] 4,229,487
[45] Oct. 21, 1980

[54] METHOD AND APPARATUS TO MAKE COOKIES

[75] Inventor: William G. Crothers, Princeton, N.J.

[73] Assignee: Deer Park Baking Co., Hammonton, N.J.

[21] Appl. No.: 35,313

[22] Filed: May 2, 1979

[51] Int. Cl.² ............................................. A21D 6/00
[52] U.S. Cl. ................................. 426/496; 426/512; 425/362; 425/363; 425/237; 99/353
[58] Field of Search ............... 426/512, 104, 389, 496, 426/549; 425/362, 363, 335, 256, 261, 237; 198/606, 607; 99/353, 443

[56] References Cited

U.S. PATENT DOCUMENTS

| | | | |
|---|---|---|---|
| 1,724,827 | 8/1929 | Costello | 425/362 |
| 1,971,087 | 8/1934 | Werner | 425/362 |
| 2,167,388 | 7/1939 | Kremmling | 425/362 |
| 2,212,743 | 8/1940 | Kremmling | 198/607 |
| 3,318,264 | 5/1967 | Weidenmiller | 425/362 |
| 4,075,359 | 2/1978 | Thulin | 426/512 |

Primary Examiner—S. Leon Bashore
Assistant Examiner—Michael L. Goldman
Attorney, Agent, or Firm—Marvin Feldman; Stephen E. Feldman

[57] ABSTRACT

A cookie machine comprises a cookie shaping device for forming dough into cookies. A transfer conveyor has a transfer surface extending between a first location where the formed dough is received on the transfer surface to a second location where the formed dough is removed from the transfer surface. An oven conveyor is adjacent to and partially disposed above the transfer conveyor for receiving the formed dough from the transfer conveyor whereby the formed dough substantially remains at the height of the second location as the formed dough is received on the oven conveyor.

18 Claims, 4 Drawing Figures

U.S. Patent  Oct. 21, 1980  4,229,487
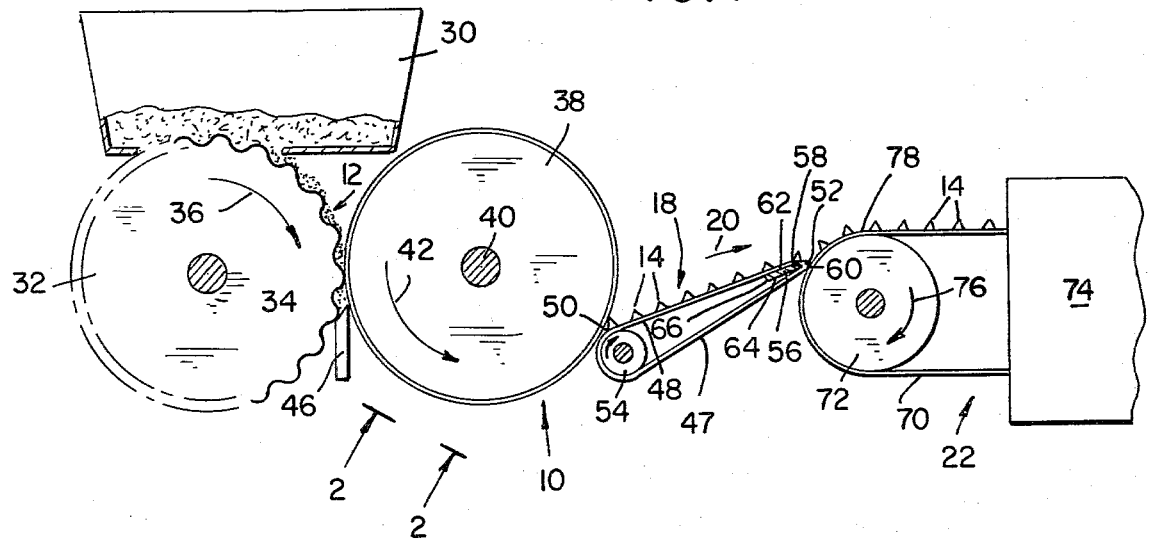
FIG. 1
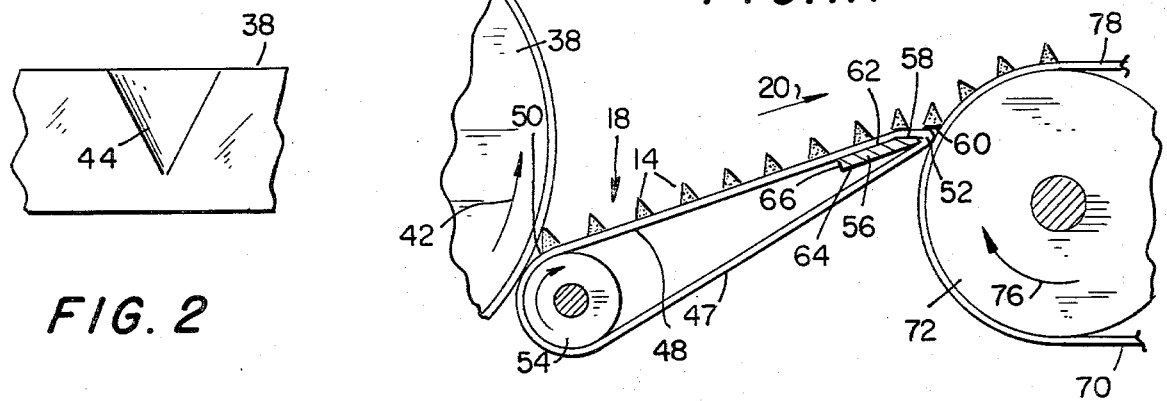
FIG. 1A
FIG. 2
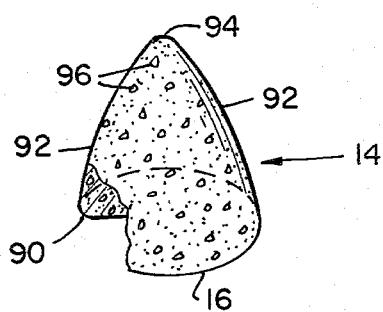
FIG. 3

METHOD AND APPARATUS TO MAKE COOKIES

BACKGROUND OF THE INVENTION

While the invention is subject to a wide range of applications, it is especially suited for use in a cookie machine and will be particularly described in that connection.

In the past, a number of different types of cookie machines have been used to form cookies in a desired configuration by the use of a rotary die drum. Then the formed dough is delivered by a first conveyor belt to a second conveyor belt which may carry the formed dough into an oven for baking.

For example U.S. Pat. No. 1,971,087 to Werner discloses a cookie machine wherein the cookies leave the die drum and are carried by a transfer belt downwardly towards a stationary shoe. At this point, the cookies drop off the belt and fall onto moving pans.

In the situation where the formed dough has a configuration, such as a conical shape, allowing the dough to fall from a first conveyor onto a second conveyor or a pan as in Wermer may cause the conically shaped piece of dough to topple over and lose the desired shape.

U.S. Pat. No. 3,318,264 to Weidenmiller discloses a delivery belt 130 which receives molded dough which is generally flat from a rotary die unit 116. The delivery belt 130 moves in a substantially horizontal direction until it reaches a plate 133 where the cookie dough drops onto a delivery belt 140. It should be noted that the cookie dough drops a substantial distance from the belt 130 to the belt 140. Although this structure is quite adequate for dough having a somewhat thin pancake shape, it does not perform properly when the dough is shaped with a taller configuration such as for example, a conical configuration. With the taller configuration, a problem occurs when the dough drops from one conveyor belt to a second conveyor belt. More specifically, this dropping action may cause the dough to fall over on its end and alter the desired shape that it will have after the dough is baked.

It is an object of the present invention provide a cookie machine which substantially obviates the limitations and disadvantageous of the described prior arrangements.

It is a further object of the present invention to provide an improved cookie machine which accurately produces cookies of a desired configuration.

It is a still further object of the present invention to provide a cookie machine which is relatively uncomplicated and therefore inexpensive to manufacture.

SUMMARY OF THE INVENTION

Accordingly there has been provided a cookie machine comprising a cookie shaping device for forming dough into cookies, and a transfer conveyor having a transfer surface extending between a first location where the formed dough is received on the transfer surface to a second location where the formed dough is removed from the transfer surface. Further, there is also provided a oven conveyor which is adjacent to and partially disposed above the transfer conveyor for receiving the formed dough from the transfer conveyor whereby the formed dough substantially remains at the height of the second location as the formed dough is received on the oven conveyor.

For a better understanding of the present invention, together with other and further objects thereof, reference is had to the following description, taken in connection with the accompanying drawings, while its scope will be pointed out in the appended claims.

BRIEF DESCRIPTION OF THE DRAWINGS

FIG. 1 is a side view of a cookie machine in accordance with the present invention;

FIG. 1A is a fragmentary view of a portion of the cookie machine;

FIG. 2 is a greatly enlarged fragmentary view of the cookie die roll; and

FIG. 3 is a greatly enlarged perspective view of a cookie bit.

DESCRIPTION OF THE PREFERRED EMBODIMENT

A cookie machine 10 comprises a cookie shaping device 12 for forming dough into a configuration 14 with a base portion 16. A transfer conveyor 18 has a transfer surface 48 extending between a first location 50 where the formed dough is received on the transfer surface to a second location 52 where the formed dough is removed from the transfer surface. An oven conveyor 22 is adjacent to and partially disposed above the transfer conveyor 18 for receiving the formed dough from the transfer conveyor whereby the formed dough substantially remains at the height of the second location 52 as the formed dough is received on the oven conveyor 22.

Referring to FIG. 1, the cookie machine 10 comprises a cookie shaping device 12 which generally forms the dough into cookies of a desired configuration. The term "cookie" actually refers to the dough after it has been baked. However, for simplification, the formed dough will hereafter be termed "cookie" because this machine deals only with unbaked dough and therefore the term "cookie" whenever it is mentioned herein will refer to the dough formed into a desired configuration 14 to make a cookie or cookie bit.

The cookie shaping device includes a feed hopper 30 which contains the mass of dough which is to be shaped into the cookies. A feed roll 32 is cylindrical in shape and has corrugated metal 34 mounted on its periphery. The feed roll is located angled below the feed hopper so that rotation of the feed roll as indicated by arrow 36 receives the dough from the feed hopper 30. The dough sticks to the corrugated metal and is carried downward in a clockwise direction as illustrated.

A cylindrical rotary die roll 38 is provided adjacent to the feed roll 32 and is rotated about a shaft 40 in a counterclockwise direction as indicated by arrow 42. The circumference of the cylindrical die roll 38 is provided with a plurality of inverted cone-shaped cavities 44 as best seen in FIG. 2. The die roll is generally made of highly polished metal so that the dough, forced into the cavities, can be later extracted. Each of the inverted cone-shaped cavities 44 is preferably teflon coated to prevent the dough from sticking within the cavities themselves. The teflon has a very low coefficient of friction and is required in the present design due to the large amount of dough which contacts the walls of the conically shaped cavities 44.

A doctor blade 46 is located adjacent to the die roll 38 and acts to strip off all excess dough except in the cavities 44 as will be later described.

Referring to FIG. 1A, a transfer conveyor generally indicated by 18 includes an endless conveyor belt 47 which has a transfer surface 48. The transfer surface is herein considered to be the portion of the endless conveyor belt 47 extending between a first location 50 where the formed dough is received on the transfer surface to a second location 52 where the formed dough is removed from the transfer surface.

The conveyor belt 47 is made of any desirable flexible material such as for example canvas.

A rotating transfer drum 54 is provided at one end of the transfer conveyor adjacent to the die roll 38 and receives the conveyor belt around a portion of its circumference. The drum 54 may be made out of a resilient material, such as rubber, to facilitate removal of the cookie bits as will be further described. A nose bar element 56 is provided at the other end of the transfer conveyor where the dough is transferred to the oven conveyor 22 as will be further described.

The nose bar element 56, as best seen in FIG. 1A, includes a flat surface 58 extending in a substantially horizontal direction whereby the conveyor belt 47 is directed in a horizontal direction toward a pick-up point 60 on the oven conveyor 22. The nose bar 56 also has a second surface 62 adjacent the flat surface and extending along the transfer surface. The transfer surface extends at an angle of between approximately 15° and 25° to a horizontal center line through the rotating transfer drum from the transfer drum to the surface 58. The nose bar element further includes a bottom surface 64 substantially parallel to said second surface 62 and an end surface 66 substantially perpendicular to said second surface and said bottom surface. Although the nose bar element is preferably formed as shown in the preferred embodiment, it is within the scope of the present invention to provide any desired shape nose bar element such as, for example, a thin rod element. The important consideration of the nose bar element is that a sharp, preferably knife edge surface is adjacent the oven conveyor whereby the formed dough can be picked up by the oven conveyor without dropping from the height of the transferred surface adjacent the oven conveyor (herein called the second location).

An oven conveyor 22 includes an oven conveyor belt 70 encircling a portion of a rotating drum 72. The oven conveyor belt is preferably made out of a steel material in that it enters an oven 74 where the cookies are baked. The rotating drum 72 is preferably an idler and the conveyor belt is actually rotated by a conventional power driven drum (not shown). The oven conveyor belt moves in a clockwise direction around the rotating drum as indicated by arrow 76. The belt 70 moves off of the drum from substantially the upper most point 78, and thereby moves in a horizontal direction to a center line through the center of drum 72. The conveyor belt is endless and the lower portion of the belt is substantially parallel to the upper portion of the belt as shown.

A crucial aspect of the present invention lies in the relationship between the transfer conveyor and the oven conveyor belt. The formed dough may be substantially conical in shape and are actually very tiny bits of dough. In the past, the shaped dough would drop a short distance from the transfer conveyor to the oven conveyor as indicated in the prior art described above. However, when the dough is formed into small bits, the falling movement can easily cause them to topple onto a side and thereby alter their shape. Thus, the transfer of the bit from conveyor 47 to conveyor 70 must be done in a very careful and precise manner.

Accordingly, the conveyor belt 47, as seen in FIG. 1A, moves in a horizontal direction at the second location 52 due to the flat horizontal surface 58 of the nose bar element 56. The conveyor belt 47 is adjacent to and may even contact the conveyor belt 70 at a pick up point 60 which is preferably approximately 30° above a horizontal line passing through the center of rotating drum 72. Although the preferred embodiment uses an angle of 30°, it is within the scope of the present invention to place the pick up point 60 at an angle of between 15° to 45° from the horizontal through the center of the rotating drum towards the second location 52. Thus, when the cookie bit is moving in a horizontal direction at the second location 52, the oven conveyor belt 70 moves upward and "peels" the cookie bit off of the belt 47 so that the formed dough substantially remains at the height of the transfer surface as the dough is received on the oven conveyor at the pick up point 60. When the cookie bit contacts the oven conveyor, the edge of the base portion is lifted until the entire base portion 16 sits on the surface of conveyor belt 70. Thus, the cookie bit does not topple over onto an end 92 as it moves upward toward the upper most point 78.

Referring to FIG. 3, cookie 14 comprises a general cone-shape, and is formed with a flat base 16, rounded periphery of the base 90 and tapered sides 92 converging to a rounded apex 94. The height of the apex 94 is approximately equal to the diameter of base, and is approximately ⅜ inch. Bit 14, is formed with a plurality of pores 96 which permit the absorption of a certain amount of moisture, such as the water present in ice cream.

The bits 14 by virtue of the novel configuration, may be conventionally screw impeller blended with ice cream to form a bulk product having the bits 14 dispersed in ice cream. The cookie bits 14 unlike conventional flat cookies retain their dimensional integrity despite the mechanical blending action. The bits compose about 8 to 10% of the ice cream weight.

Broadly speaking, the composition of the present invention for forming the cookie bit comprises flour, sugar and shortening, wherein it has been found that a specific sugar to shortening ratio is important to obtain and retain the desired cake-like characteristics in the ice cream. Specifically, it has been found that where the sugar:shortening ratio is in the range of 1.5:1 to 2.5:1, and preferably about 2.0:1, the desired characteristics of physical integrity with partial water absorption to form and retain a cake-like character in ice cream is obtained.

It is also understood that the term "shortening" as used hereinbefore and hereinafter throughout the specification and claims includes all fats and oils present in the dough composition.

The dough is mixed and baked under conventional processing operations and conditions as is well known in the art.

In the aforesaid composition, there is a total of 76 lbs. of sugar (cane plus invert) and a total of 43 lbs. of shortening (including 15% cocoa fat in a total of 20 lbs. of cocoa). Therefore, the ratio of sugar to shortening is about 1.8:1.

Without wishing to be bound by any theory or mechanism, it has surprisingly been found that the composition having the specified sugar:shortening ratio when formed and baked in as conical bit provides a structure which will maintain its structional integrity when dispersed in ice cream and yet absorb water to some degree so as to provide a pleasant cake taste and texture of the consumer.

It is also to be reiterated that the cookie bit of the present formulation unlike prior art cookie compositions will not disintegrate in absorbing water from ice cream but instead merely softens somewhat so as to provide a pleasant firm testure. The present limited flour component, and the limited sugar:shortening ratio is believed to contribute to this.

In the prior art the "count per pound" of cookies varied from about 35 (heavy sandwich creme) up to about 200 (small shortbread or wafer). The cookie bits of the present invention, however, have a count per pound of about 1000 to 1500, and generally about 1200 per pound. The size-weight-volume relationship of the present cookie bits permits a broad range of packaging. It is also noted that the rounded conical bit achieves the desired handling characteristics of a spherical particle without presenting the difficulties inherent in making spherical cake or cookie products. In addition to its use in ice cream, the cookie bits can be used as a dessert topping or additive, cereal or additive to a cereral; health food; confection (coated or uncoated); cheese snack or peanut butter snack.

Although the cookie has been described with a conical configuration, it is within the scope of the present invention to use cookie bits of other shapes, such as, for example, cylinders or frustoconical configurations.

In order to more fully understand the present invention, a description of its operation follows. The cookie machine generally referred to as 10 begins to operate by the feed roll 32 receiving dough from the feed hopper in the corrugations 34. The feed roll 32 moves in a clockwise direction and the dough contacts the die roll 38 where the dough is pressed into cavities 44 at the point of contact. The die roll which is rotating in a counter-clockwise direction encounters the doctor blade 46 which strips off any excess dough. Once the die roll 38 rotates to a point below the horizontal through shaft 40, the dough cones or bits 14 are extracted out of the cavities 17 onto the first location 50 of the conveyor 47. The extraction is achieved by the frictional force of the conveyor belt pressed against the dough surface 16 (see FIG. 2). The rubber roller 54 is positioned to press the conveyor belt 47 against roll 38. The cones 14 are then conveyor along the transfer surface to a second location 52 where the formed dough is removed from the transfer surface. The cookie bits are actually peeled off of the conveyor 47 so that they do not drop below the second location 52 of the transfer conveyor 18 or the pick up point 60 of the oven conveyor 22. The cookie bits then remain on the base 16 as they move upward around the rotating drum 72 on the conveyor belt 70. Next the cookies enter the oven 74 where they are baked and used as required.

As stated, this cookie machine accurately produces cookies of a desired configuration and is relatively uncomplicated and therefore inexpensive to manufacture and operate.

While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A cookie machine comprising:
   (a) cookie shaping means for forming dough into individual cookies;
   (b) transfer conveyor means having a transfer surface extending between a first location where said formed cookies are received on said transfer surface to a second location above said first location where said cookies are removed from said transfer surface; and
   (c) oven conveyor means directly adjacent to and extending above said transfer conveyor means for receiving said cookies from said transfer conveyor, whereby said cookies are transferred upwardly onto said oven conveyor means.

2. The cookie machine as defined in claim 1 further characterized in that said oven conveyor means moves upward adjacent said transfer conveyor for carrying said cookies upward on said oven conveyor after they are received by said oven conveyor.

3. The cookie machine as defined in claim 2 further characterized in that said transfer conveyor means includes a rotating transfer drum at a first location adjacent said cookie shaping means and a nose bar element at a second location adjacent said oven conveyor means.

4. The cookie machine as defined in claim 3 further characterized in that said nose bar element has a flat surface contacting said transfer surface and extending in a substantially horizontal direction whereby said transfer surface is directed in a horizontal direction towards a pick up point on said oven conveyor means.

5. The cookie machine as defined in claim 4 further characterized in that said nose bar element has a second surface adjacent said flat surface and extending along a transfer surface having an angle of between 15° and 25° to said flat surface located at a second location adjacent said oven conveyor means.

6. The cookie machine as defined in claim 5 further characterized in that an endless transfer conveyor provides said transfer surface between said rotating transfer drum and said nose bar element.

7. The cookie machine as defined in claim 6 further characterized in that said oven conveyor means includes an oven conveyor belt encircling a portion of a second rotating drum whereby said oven conveyor belt moves off of the second rotating drum from substantially the uppermost point of said second rotating drum.

8. The cookie machine as defined in claim 7 further characterized in that said pick up point is at an angle of between approximately 15° to 45° above a horizontal line passing through the center of the second rotating drum.

9. The cookie machine as defined in claim 8 further characterized in that said transfer conveyor means contacts said oven conveyor means at said pick up point.

10. The cookie machine as defined in claim 9 further characterized in that said cookie shaping means includes a cylindrical die plate having a plurality of crevices for forming dough into cookies of a desired configuration, said cylindrical die plate being adjacent and partially above said transfer conveyor means for dropping said cookies onto said transfer conveyor belt.

11. The cookie machine as defined in claim 10 further characterized in that said plurality of crevices each has the form of an inverted cone whereby said cookies have a substantially conical configuration.

12. The cookie machine as defined in claim 11 further characterized in that said plurality of crevices are teflon coated so that the cookies easily drop out of said crevices.

13. The cookie machine as defined in claim 12 further characterized in that said cookie shaping means further includes a feed roll adjacent said cylindrical die plate for picking up dough and pressing it into said crevices; a doctor blade is adjacent said cylindrical die plate for stripping off any excess dough.

14. The cookie machine as defined in claim 13 further characterized in that said oven conveyor belt is formed of steel.

15. The cookie machine as defined in claim 14 further characterized in that said transfer conveyor belt is canvas to prevent sticking of said formed dough.

16. The machine of claim 1, wherein said transfer conveyor means contacts said oven conveyor means.

17. A process for making a cookie comprising:
 (a) forming dough into individual cookie bits;
 (b) transferring the bits by a transfer conveyor means for moving the bits between a first location where the bits are received on a transfer surface to a second location above said first location where said bits are removed from the transfer surface; and
 (c) transferring the bits to an oven conveyor means directly adjacent to and extending above said transfer conveyor means where said bits are received directly from said transfer conveyor means so that said bits are at the height of the second location as the bits are received on said oven conveyor means.

18. The process of claim 17, said dough being formed into conical bits.

* * * * *